United States Patent [19]
Tolley et al.

[11] 4,321,730
[45] Mar. 30, 1982

[54] CORE BOX SUPPORTING MEANS FOR VIBRATORY TYPE CRAB PROCESSING MACHINE

[75] Inventors: Calvert B. Tolley, Wingate, Md.; Theodore S. Reinke, Rehoboth Beach, Del.; John C. Brooks, Cambridge, Md.

[73] Assignee: Sea Savory, Inc., Cambridge, Md.

[21] Appl. No.: 173,363

[22] Filed: Jul. 29, 1980

[51] Int. Cl.³ .............................................. A22C 29/02
[52] U.S. Cl. ............................................ 17/71; 17/46
[58] Field of Search .................... 17/46, 48, 71, 1 G

[56] References Cited
U.S. PATENT DOCUMENTS

| | | | |
|---|---|---|---|
| 2,734,540 | 2/1956 | Geisler | 17/46 |
| 2,978,739 | 4/1961 | Goldberg | 17/46 |
| 4,003,103 | 1/1977 | Wenstrom et al. | 17/71 |

Primary Examiner—Willie G. Abercrombie
Attorney, Agent, or Firm—Scrivener, Clarke, Scrivener and Johnson

[57] ABSTRACT

This disclosure is of a machine for removing edible crab meat from the prepared core bodies of hard crabs by subjecting the core bodies to rapid vertical vibratory movement. An improved support means for the core body and the core body holder is provided.

1 Claim, 3 Drawing Figures

CORE BOX SUPPORTING MEANS FOR VIBRATORY TYPE CRAB PROCESSING MACHINE

SUMMARY OF THE INVENTION

Apparatus for removing edible crab meat from a crab body that has been de-shelled, de-legged and de-fingered and the visceral cavity of which has been cleaned. The crab bodies are supported in a core box with each body directed downwardly over a discharge opening, and the core box is vibrated vertically, thereby shaking the crab meat from the bodies. Improved support means for the core box are provided.

DESCRIPTION OF THE INVENTION

The present invention is an improvement on a crab processing machine of the vibrfating type such as those described in U.S. Pat. No. 4,003,103 issued Jan. 18, 1977 for Apparatus For Separating Edible Crab Meat From Non-Edible Portions of Cooked Crabs invented by Wenstrom, Reinke, Tolley and Brooks.

Figure 3:
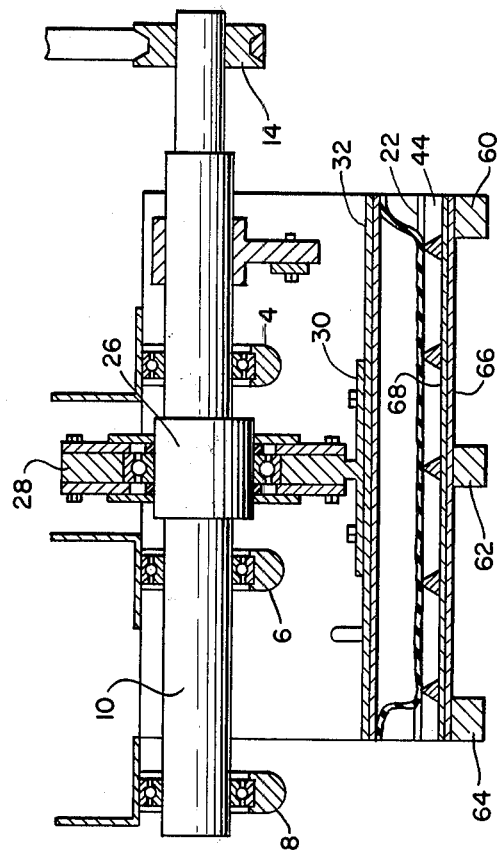
FIG. 3 is a perspective view of a core box embodying the invention.
Figure 2:
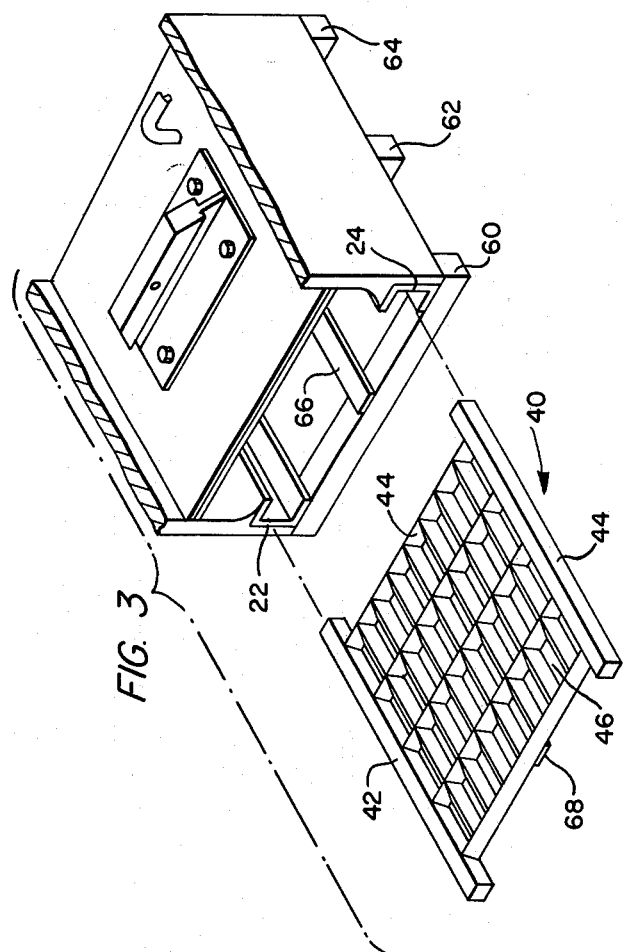
FIG. 2 is a sectional view taken on line 2—2 of FIG. 1 and more particularly illustrating the invention.
Figure 1:
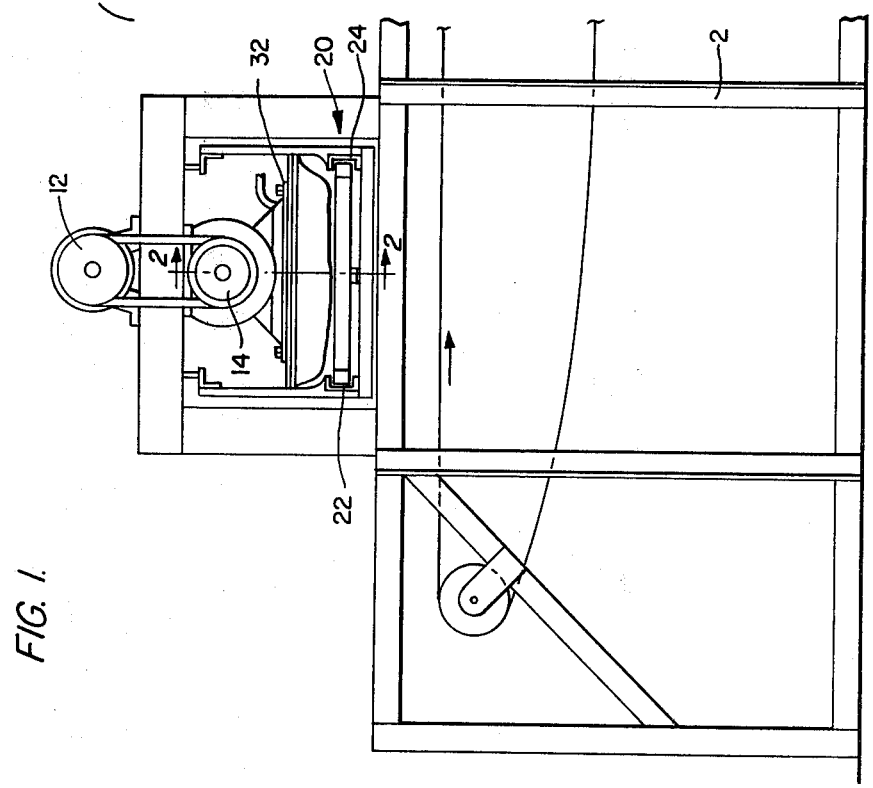
FIG. 1 is a side elevational view of parts of a vibrating type of crab meat processing machine.

A machine of the type to which the invention relates is disclosed, in pertinent part, in FIGS. 1 and 2 of the drawings and comprises a frame 2 carrying aligned bearings 4, 6, 8 which rotatably support a shaft 10 which is driven by means such as electric motor 12 through drive pulley 14. A core box holder 20 includes a pair of opposed, spaced facing channel members 22, 24 which are adapted to be vertically vibrated by means of an eccentric 26 formed on or secured to the shaft 10. An eccentric strap 28 surrounds the eccentric and carries a supporting plate 30 which is connected to a cover plate 32 by means of bolts. Cover plate 32 overlies the channel members 22, 24 and is secured to them in any suitable manner. It will be apparent that when the shaft 10 and eccentric 26 are rotated the core box holder 20 will be vertically vibrated at a speed depending on the speed of rotation of the shaft.

A core box is provided in a machine of the type to which the invention relates, and is constructed and adapted to be introduced into the machine by being removably held by and between the facing channel members 22, 24. The core box is described in the United States Letters Patent referred to above, to which reference is made for a more detailed description of a preferred embodiment. The core box comprises an open-topped rectangular tray 40 having side rails 42 interconnected by a plurality of spaced-apart crab-supporting rails or bars 44, the spacing between the rails defining discharge openings 46, the spacing being slightly less than the width of the core portion of a cooked crab that has been de-shelled, de-legged and de-fingered, and the central cavity of which has been cleaned. As shown, the crab cores are positioned in rows between adjacent bars 44 and the sides of the bars converge downwardly toward the discharge openings and are angularly directed to engage the bony structure of the sides of the crab cores. Thus, the sides of the crab core closely engage the sides of the rails 44, the sides of the body meaning the opposite portions where the legs were attached. As fully described in the Letters Patent referred to, crab cores are positioned in an inverted position with the bottoms of the crab uppermost and with the cleaned cavities and the mouth portions directed downwardly and aligned with the discharge openings in the core box.

In order to firmly and resiliently hold the crab cores in position during vibration thereof, a pneumatic cushion 50 is positioned beneath cover plate 32, and compressed air may be admitted above the cushion through a flexible hose connection whereupon the cushion will resiliently hold the crab cores in position during vibration of the core box.

Means are provided by the invention for stabilizing the core box holder and supporting the core box within the holder. Such means comprise, first, a plurality of elongated support members, which are preferably rigid tubes made of a light weight metal such as aluminum, which are connected to the lower surface of the core box holder in spaced parallel relation to each other, three of these being disclosed at 60, 62, 64 in this preferred embodiment of the invention. An elongated strip 66 of rigid material, which is also preferably a lightweight metal, is connected to the upper surfaces of the support members and extends transversely across them at their aligned centers. It will be seen that this strip lies between the facing guide means 22, 24 which receive the sides of the core box. A second elongated rigid strip 68, which is also preferably formed of a lightweight metal, is connected to the lower surface of the core box 40 and extends entirely from front to back thereof and centrally between its side edges whereby it will lie above and in surface-to-surface engagement with strip 66 when the core box is positioned within the holder.

It will be understood that the support members 60, 62, 64 will add rigidity and strength to the core box holder itself and, through the engagement between strips 66 and 68, the core box will be firmly supported in the core box holder thereby resisting in an improved manner the large stresses imposed on the core box during the rapid vertical vibratory movement imposed during operation of the machine, which may be of the order of 1500 to 5000 vibrations per minute.

We claim:

1. A machine for removing edible crab meat from the cores of crab bodies which have been cooked, de-shelled, de-legged and de-fingered and the body cavities of which have been cleaned out, comprising a generally horizontal core box including a bottom wall containing a plurality of discharge openings each of a size slightly smaller than that of a crab body, the crab bodies being arranged on the core box with their cavities facing downwardly over the discharge openings, a core box holder for supporting the core box in the machine, means for vertically vibrating the core box holder and the core box thereby to shake the edible crab meat from the crab bodies, and means for supporting the core box on the core box holder comprising a plurality of spaced parallel rigid elongated support members extending across and connected to the bottom of the core box holder, a first strip extending across and below the support members and connected thereto centrally of the lengths thereof, and a second strip extending across the lower surface of the core box and positioned to lie in surface-to-surface engagement with the upper surface of the first strip when the core box is positioned in the core box holder.

* * * * *

UNITED STATES PATENT AND TRADEMARK OFFICE
CERTIFICATE OF CORRECTION

PATENT NO. : 4,321,730

DATED : March 30, 1982

INVENTOR(S) : Calvert B. Tolley, Theodore S. Reinke, John C. Brooks

It is certified that error appears in the above-identified patent and that said Letters Patent are hereby corrected as shown below:

In Column 2, line 61, change "below" to --above--.

Signed and Sealed this

Sixth Day of May 1986

[SEAL]

Attest:

DONALD J. QUIGG

Attesting Officer

Commissioner of Patents and Trademarks